United States Patent
Yokomitsu et al.

(10) Patent No.: US 8,639,045 B2
(45) Date of Patent: Jan. 28, 2014

(54) IMAGE PROCESSING DEVICE AND IMAGE PROCESSING METHOD

(75) Inventors: Sumio Yokomitsu, Tokyo (JP); Hirofumi Fujii, Kanagawa (JP); Takeshi Fujimatsu, Kanagawa (JP); Takeshi Watanabe, Kanagawa (JP); Yuichi Matsumoto, Kanagawa (JP); Michio Miwa, Chiba (JP); Masataka Sugiura, Tokyo (JP); Mikio Morioka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/393,983

(22) PCT Filed: Mar. 2, 2010

(86) PCT No.: PCT/JP2010/001422
§ 371 (c)(1),
(2), (4) Date: Mar. 2, 2012

(87) PCT Pub. No.: WO2011/027483
PCT Pub. Date: Mar. 10, 2011

(65) Prior Publication Data
US 2012/0155769 A1      Jun. 21, 2012

(30) Foreign Application Priority Data

Sep. 3, 2009   (JP) ................. 2009-204038

(51) Int. Cl.
*G06K 9/36* (2006.01)
*G06K 9/46* (2006.01)
(52) U.S. Cl.
USPC ....... 382/232; 375/240.12; 382/173; 382/209
(58) Field of Classification Search
USPC ........... 348/36, 39, 135; 375/240.01, 240.12; 382/173, 232, 234
See application file for complete search history.

(56) References Cited

U.S. PATENT DOCUMENTS 5,574,503 A * 11/1996 May ................. 375/240.12
5,995,447 A * 11/1999 Mandal et al. ........... 367/35

(Continued)

FOREIGN PATENT DOCUMENTS

JP    11-348659    12/1999
JP    3573653      10/2004

(Continued)

OTHER PUBLICATIONS

Roger Y. Tsai, "A Versatile Camera Calibration Technique for High-Accuracy 3D Machine Vision Metrology Using Off-the-Shelf Shelf TV Cameras and Lenses", IEEE Journal of Robotics and Automation, vol. RA-3, No. 4, Aug. 1987, pp. 323-344.

*Primary Examiner* — Gregory M Desire
(74) *Attorney, Agent, or Firm* — Greenblum & Bernstein, P.L.C.

(57) ABSTRACT

An image processing device comprises a region dividing unit which divides a captured image obtained by a camera unit into a plurality of regions, and an image compressing unit which compresses each of region images obtained by the division by the region dividing unit while changing the compression rate according to the distance from a predetermined point in the captured image to each of the region images and the distance from the camera unit to a target included in each of the regions. For example, the image compressing unit compresses the region image having a larger angle from the optical axis at a larger compression rate, thereby achieving compression in which the amount of data in low-quality regions is greatly reduced and the quality of high-quality regions is maintained.

8 Claims, 15 Drawing Sheets

(56) References Cited

U.S. PATENT DOCUMENTS

| | | | |
|---|---|---|---|
| 6,750,903 B1 * | 6/2004 | Miyatake et al. | 348/218.1 |
| 6,950,557 B2 * | 9/2005 | Kimura | 382/239 |
| 7,081,917 B2 * | 7/2006 | Shimoyama et al. | 348/135 |
| 7,145,947 B2 * | 12/2006 | Koga | 375/240.01 |
| 7,254,273 B2 * | 8/2007 | Sakanashi et al. | 382/238 |
| 8,144,033 B2 * | 3/2012 | Chinomi et al. | 340/937 |
| 8,264,524 B1 * | 9/2012 | Davey | 348/36 |
| 2004/0085447 A1 | 5/2004 | Katta et al. | |
| 2006/0008162 A1 * | 1/2006 | Chen et al. | 382/239 |
| 2006/0228034 A1 | 10/2006 | Mizuno et al. | |
| 2009/0251530 A1 * | 10/2009 | Cilia | 348/39 |
| 2009/0268046 A1 * | 10/2009 | Ogawa | 348/222.1 |
| 2010/0033552 A1 * | 2/2010 | Ogawa | 348/36 |

FOREIGN PATENT DOCUMENTS

| | | |
|---|---|---|
| JP | 2006-295299 | 10/2006 |
| JP | 2007-318596 | 12/2007 |
| JP | 2007-318597 | 12/2007 |
| JP | 2008-193458 | 8/2008 |
| JP | 2008-193530 | 8/2008 |

* cited by examiner

| ANGLE | RESOLUTION RATIO | α VALUE |
|---|---|---|
| 0 | 190 | 190/190 |
| 10 | 180 | 190/180 |
| 20 | 170 | 190/170 |
| 30 | 160 | 190/160 |
| 40 | 150 | 190/150 |
| 50 | 140 | 190/140 |
| 60 | 130 | 190/130 |
| 70 | 120 | 190/120 |
| 80 | 110 | 190/110 |
| 90 | 100 | 190/100 |

FIG.9

| COMPRESSION PATTERN | COMPRESSION RATE (LARGER NUMERIC VALUE INDICATES SMALLER POST-COMPRESSION DATA AMOUNT) | | | | | | EFFECT |
|---|---|---|---|---|---|---|---|
| | T1 | T2 | T3 | T4 | T5 | T6 | |
| FIRST COMPRESSION METHOD: COMPRESSION RATE PROPORTIONAL TO ANGLE AND DISTANCE | 10 | 16 | 5 | 8 | 30 | 30 | DATA AMOUNT OF LOW-QUALITY REGION GREATLY REDUCED, QUALITY OF HIGH-QUALITY REGION MAINTAINED |
| SECOND COMPRESSION METHOD: COMPRESSION RATE INVERSELY PROPORTIONAL TO ANGLE AND DISTANCE | 4 | 3 | 8 | 5 | 16 | 10 | IMAGE OF AVERAGE RESOLUTION OBTAINED IN ALL REGIONS |

FIG.10

IMAGE PROCESSING DEVICE AND IMAGE PROCESSING METHOD

TECHNICAL FIELD

The present invention relates to an image processing apparatus and image processing method, and relates to a technology that compresses an image obtained by means of an omnidirectional camera or suchlike wide-angle camera.

BACKGROUND ART

An omnidirectional camera enables an image with a wide field-of-view range to be obtained with a single camera, and is therefore widely used in a variety of fields. Omnidirectional cameras are used in monitoring systems and the like, for example. An omnidirectional camera enables an omnidirectional image to be obtained using an omnidirectional lens optical system or omnidirectional mirror optical system.

When an omnidirectional image is acquired at high resolution there is a large amount of information, and therefore an image is often compressed before being sent to a channel or recorded on a recording medium.

Technologies that reduce the amount of omnidirectional image data are disclosed in Patent Literatures 1 and 2. Patent Literatures 1 and 2 disclose technologies that reduce the amount of omnidirectional image data by reducing the number of colors or increasing the compression rate of an image other than a circular image among rectangular images that include a circular image obtained by means of an omnidirectional camera.

Also, Patent Literature 3 discloses a technology that reduces the amount of image data by changing the compression rate according to an imaging location or imaged object.

CITATION LIST

Patent Literature

PTL 1
Japanese Patent Application Laid-Open No. 2007-318596
PTL 2
Japanese Patent Application Laid-Open No. 2007-318597
PTL 3
Japanese Patent No. 3573653

Non-Patent Literature

NPL 1
"A Versatile Camera Calibration Technique for High-Accuracy 3D Machine Vision Metrology Using Off-the-Shelf TV Cameras and Lenses", Roger Y, Tsaim IEEE Journal of Robotics and Automation, Vol. RA-3, No. 4, August 1987, pp 327 Equation 5a

SUMMARY OF INVENTION

Technical Problem

Previously proposed image data compression methods cannot be said to take sufficient account of wide-angle camera characteristics when performing data compression. As a result, there are still insufficiencies in terms of performing high-image-quality, high-efficiency image compression that takes the camera characteristics of a wide-angle camera into consideration.

The present invention has been implemented taking into account the problem described above, and it is an object of the present invention to provide an image processing apparatus and image processing method capable of performing high-image-quality, high-efficiency image compression that takes the camera characteristics of a wide-angle camera into consideration.

Solution to Problem

One aspect of an image processing apparatus of the present invention is provided with: a region division section that divides a captured image obtained by an imaging section into a plurality of regions; and an image compression section that compresses each region image resulting from division by the region division section while changing the compression rate according to a degree of distortion when the imaging section acquires the captured image.

One aspect of an image processing apparatus of the present invention is provided with: a region division section that divides a captured image obtained by means of a camera into a plurality of regions; and an image compression section that compresses each region image resulting from division by the region division section while changing the compression rate according to a length from a predetermined point in the captured image to each region image.

Advantageous Effects of Invention

The present invention performs compression processing using camera characteristics peculiar to an omnidirectional camera or suchlike wide-angle camera, enabling image compression to be performed that achieves compatibility of image quality and compression rate.

BRIEF DESCRIPTION OF DRAWINGS

FIG. 3 shows the relationship between an angle from the optical axis and a captured image, in which

FIG. 9 shows examples of α values used in compression rate calculation;

FIG. 10 shows actual examples of compression rates;

DESCRIPTION OF EMBODIMENTS

[1] Principles

Figure 1:
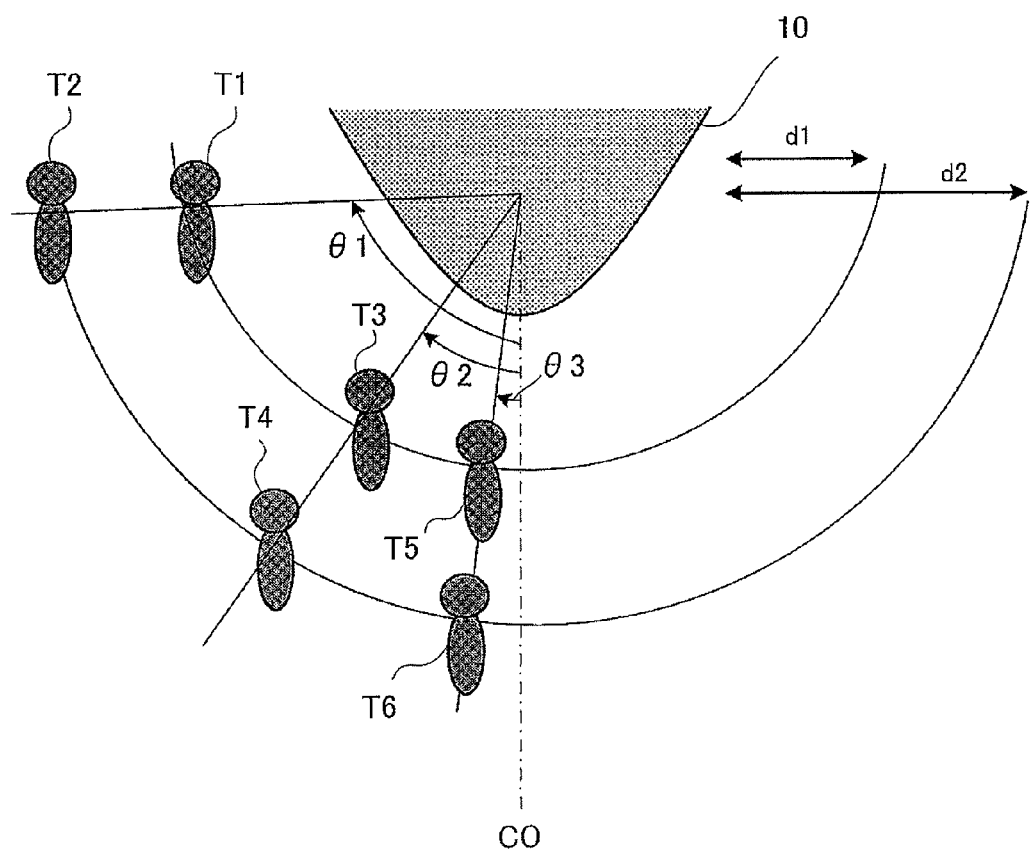
FIG. 1 shows how targets are imaged by an omnidirectional camera.

Before describing the embodiments, the principles of the embodiments will first be explained.

The inventors of the present invention noted that there are great differences in image quality according to the image region in an image obtained by means of an omnidirectional camera or suchlike wide-angle camera. More particularly, in an omnidirectional image obtained by means of an omnidirectional camera, image quality differs significantly according to the image region.

First, the present inventors noted that the following characteristics appear in a captured image due to camera characteristics of an omnidirectional camera.

In the case of a captured image in the vicinity of the optical axis direction of a camera, there is little distortion and little aberration, and resolution is high. In other words, the farther a direction is from the optical axis direction of a camera, the greater is the distortion, the greater the aberration, and the lower the resolution of a captured image.

The greater the distance of an object from a camera, the lower is the resolution of a captured image.

Here, the optical axis direction of an omnidirectional camera may also be called the frontal direction or central direction of an omnidirectional camera.

The above characteristic "in the case of a captured image in the vicinity of the optical axis direction of a camera, there is little distortion and little aberration, and resolution is high" is a characteristic that also appears in a narrow-angle camera (hereinafter referred to as a normal camera) as well as an omnidirectional (wide-angle) camera, but is particularly pronounced in an ultra-wide-angle camera such as an omnidirectional camera. Furthermore, the above characteristic "the greater the distance of an object from a camera, the lower is the resolution of a captured image" also appears in a normal camera, but is also more pronounced in an ultra-wide-angle camera such as an omnidirectional camera than in a normal camera.

In the present invention, utilizing the above characteristics of an omnidirectional (wide-angle) camera, a captured image is divided into a plurality of regions according to the angle from the optical axis of the camera, and the divided region images are compressed while changing the compression rate according to the angle from the optical axis to each region image. When considering only a captured image, this processing can be said to comprise dividing a captured image obtained by means of a camera into a plurality of regions, and compressing the divided region images while changing the compression rate according to the length from a predetermined point in the captured image to each region image. Also, in the present invention, the compression rate is changed according to the distance from the camera to a target included in each region image.

In the present invention, the following two compression methods are proposed as methods of changing the compression rate according to an angle and distance as described above:

First compression method: "Greatly reducing the data amount of a low-quality region, and maintaining the quality of a high-quality region"

Second compression method: "Obtaining an image of average resolution in all regions"

The first and second compression methods are described below in turn.

[1-2] First compression method: "Greatly reducing the data amount of a low-quality region, and maintaining the quality of a high-quality region"

In this compression method, the compression rate is changed in accordance with following rules (i) through (iii).

(i) The larger the angle from the optical axis of an obtained region image, the larger is the compression rate used for compression.

(ii) The greater the distance of an object image from the camera, the larger is the compression rate used for compression.

(iii) An image obtained in the vicinity of the optical axis is compressed using a large compression rate.

By performing processing (i), an image whose image quality is originally not very good due to distortion or the like, for which image quality degradation is not conspicuous during display even if the amount of information is reduced, and that is obtained at a large angle from the optical axis of the camera, has a larger compression rate applied, enabling the amount of image data to be greatly reduced while suppressing substantial image quality degradation. Also, since the compression rate is changed by means of the simple parameter "angle from the optical axis," the compression rate can be changed without performing complex image processing.

Similarly, by performing processing (ii), a target far from the camera whose image quality is originally not very good due to distortion or the like, and for which image quality degradation is not conspicuous during display even if the amount of information is reduced or that cannot be used for person identification or the like, has a larger compression rate applied, enabling the amount of image data to be greatly reduced while suppressing substantial image quality degradation.

The reason for performing processing (iii) will now be explained. Omnidirectional cameras are often installed on a ceiling or pillar, directed toward the ground, in which case a captured image of a person present in the optical axis direction of the camera is likely to show only the person's head. The present inventors considered that, since the significance of an image showing only a person's head is low, it is acceptable for a larger compression rate to be used for such a head image, and for image quality to degrade accordingly. As a result of such consideration, the present inventors thought that, by performing processing (iii), the amount of code of an image that is not a significant region can be reduced, and the overall amount of code can be reduced.

A conventional technology for reducing the compression rate in proportion to the significance of an image is ROI (Region of Interest) encoding. ROI encoding is a technology whereby a region of interest of an image is encoded with different image quality from other regions. Specifically, image quality degradation of a region of interest is suppressed by making the compression rate proportionally smaller for a region of interest. However, with ROI encoding, the degree of degradation of a significant image differs according to which region is made a region of interest, and therefore which region is set as a region of interest is important. Accurate region of interest setting generally requires image processing such as pattern recognition, which results in an increased amount of computation.

In contrast, with processing (iii), significance is decided by making efficient use of the characteristics of an omnidirectional (wide-angle) image, enabling a significant region of an omnidirectional image to be set accurately without incurring a large increase in the amount of computation. As a result, high-quality, high-compression-rate compressed image data can be obtained with a comparatively small amount of computation.

Here, above processing (i) through processing (iii) can be used in combination as appropriate. For example, above processing (i) through processing (iii) may all be used, or only above processing (i) may be performed, with above processing (ii) and processing (iii) not being performed. Alternatively, above processing (i) and processing (ii) may be performed, with above processing (iii) not being performed, or above processing (i) and processing (iii) may be performed, with above processing (ii) not being performed.

When above processing (i) and processing (iii) are performed in combination, for example, provision may be made for an image obtained at an angle of less than 5° from the optical axis to be compressed using a large compression rate (performing processing (iii)), and for an image obtained at an angle of 5° or more from the optical axis to be compressed using a compression rate that is larger in proportion to the size of the angle from the optical axis (performing processing (i)).

[1-3] Second compression method: "Obtaining an image of average resolution in all regions"

In this compression method, the compression rate is changed in accordance with following rules (iv) and (v).

(iv) The larger the angle from the optical axis of an obtained region image, the smaller is the compression rate used for compression.

(v) The greater the distance of an object image from the camera, the smaller is the compression rate used for compression.

By performing processing (iv), the greater the degree to which the image quality of an image is originally not very good due to distortion or the like, the more further degradation due to compression can be suppressed, as a result of which an image of uniform (average) quality in all regions can be obtained. Also, since the compression rate is changed by means of the simple parameter "angle from the optical axis," the compression rate can be changed without performing complex image processing.

Similarly, by performing processing (v), the greater the degree to which the image quality of an image is originally not very good due to low resolution or the like, the more further degradation due to compression can be suppressed, as a result of which an image of uniform (average) quality in all regions can be obtained.

Here, above processing (iv) and processing (v) may be used in combination, or only above processing (iv) may be performed, with processing (v) not being performed.

[1-4] Processed Images

Processed images of the present invention will now be described, using FIG. 1 through FIG. 10.

FIG. 1 shows how omnidirectional camera 10 images targets T1 through T6. In the example shown in the figure, targets are persons, but a target is not limited to a person. In the example shown in FIG. 1, omnidirectional camera 10 is installed on a ceiling or pillar, directed toward the ground. In the figure, C0 is the optical axis of the omnidirectional camera. FIG. 1 shows the nature of imaging by omnidirectional camera 10 viewed from a direction parallel to the ground.

Figure 2:
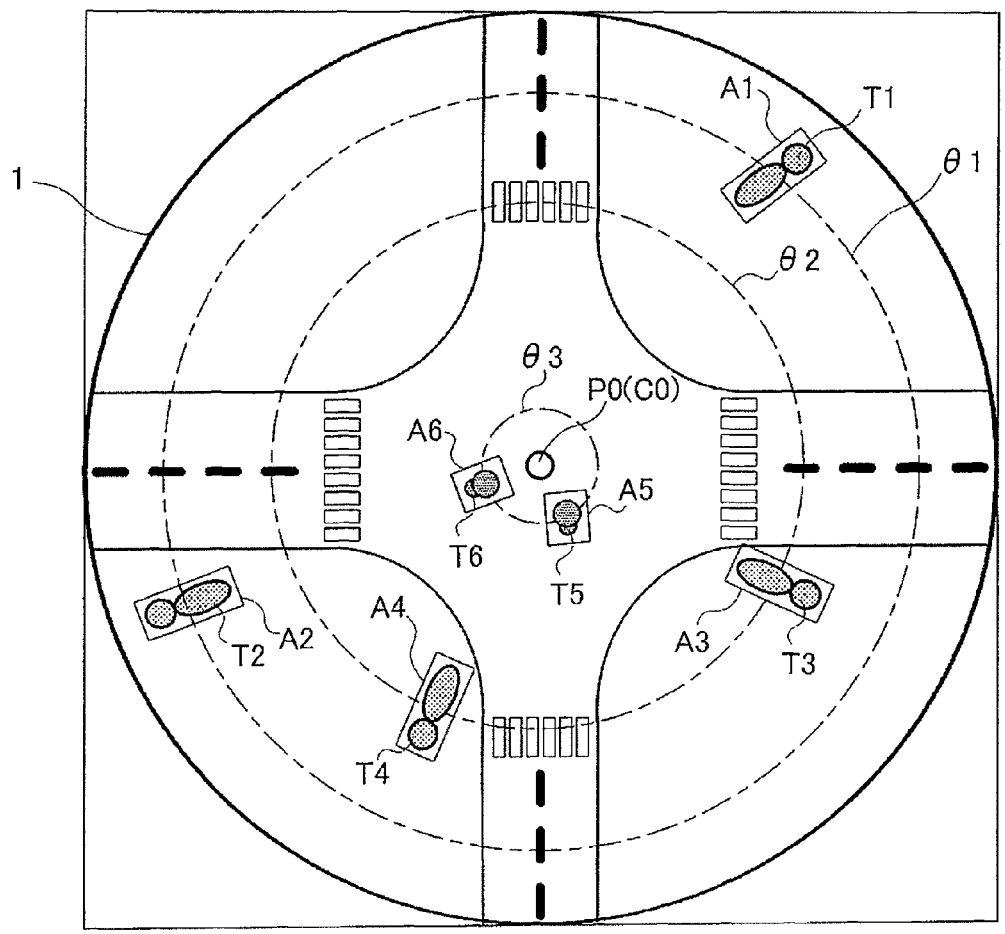
FIG. 2 shows an omnidirectional image captured by an omnidirectional camera.

FIG. 2 shows omnidirectional image 1 captured by omnidirectional camera 10.

In FIG. 1 and FIG. 2, targets T1 and T2 are present at positions at angle θ1 from optical axis C0, targets T3 and T4 are present at positions at angle θ2, and targets T5 and T6 are present at positions at angle θ3. Here, the relationship between θ1, θ2, and θ3 is θ1>θ2>θ3. Also, targets T1, T3, and T5 are present at positions at distance d1 from omnidirectional camera 10, and targets T2, T4, and T6 are present at positions at distance d2 from omnidirectional camera 10. Here, the relationship between d1 and d2 is d1<d2.

Figure 3A:
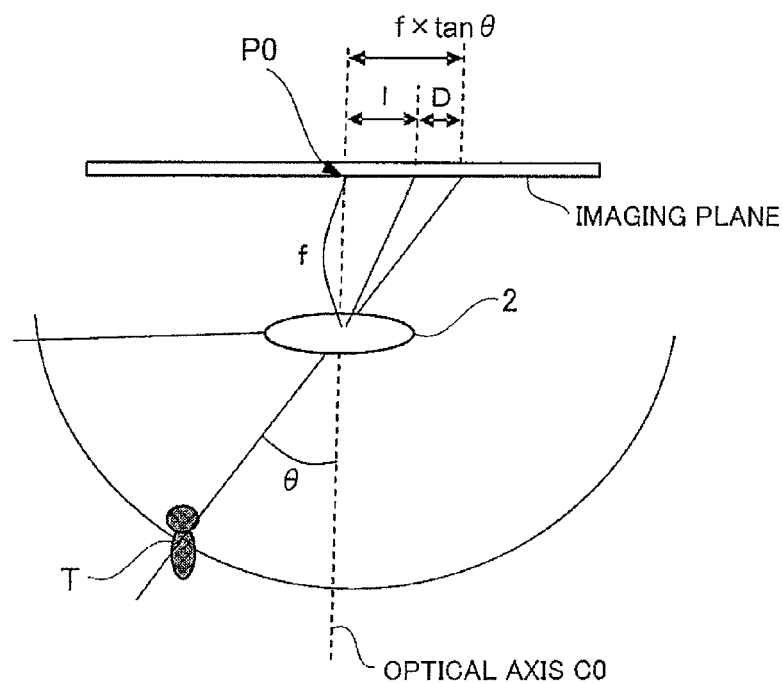
FIG. 3A shows at what position on an imaging plane an object present at angle θ in real space is imaged via an optical system.

FIG. 3 shows the relationship between angle θ from optical axis C0 and a captured image. FIG. 3A shows at what position on an imaging plane an object present at angle θ in real space is imaged via optical system 2. Here, if a point corresponding to optical axis C0 on the imaging plane is designated P0, a point on the imaging plane corresponding to object T is a point at distance 1 from point P0. Point P0 becomes a point at the center of a captured image in an omnidirectional image.

The distance from point P0 to an intersection point between an extended line of a line linking object T1 to the optical center of optical system 2 and the imaging plane is expressed by f×tan θ, where f is the focal length of the camera. The relationship between distance 1 and f×tan θ is expressed by the following equation, using coefficients $\kappa_1$, $\kappa_2$, and so forth representing lens distortion.

$$f \times \tan\theta = 1 + 1 \times (\kappa_1 \times 1^2 + \kappa_2 \times 1^4 + \ldots)$$
$$= 1 \times (1 + \kappa \times 1^2 + \kappa_2 \times 1^4 + \ldots)$$

(Equation 1)

Above equation 1 is included in Non-Patent Literature 1, for example.

Figure 3B:
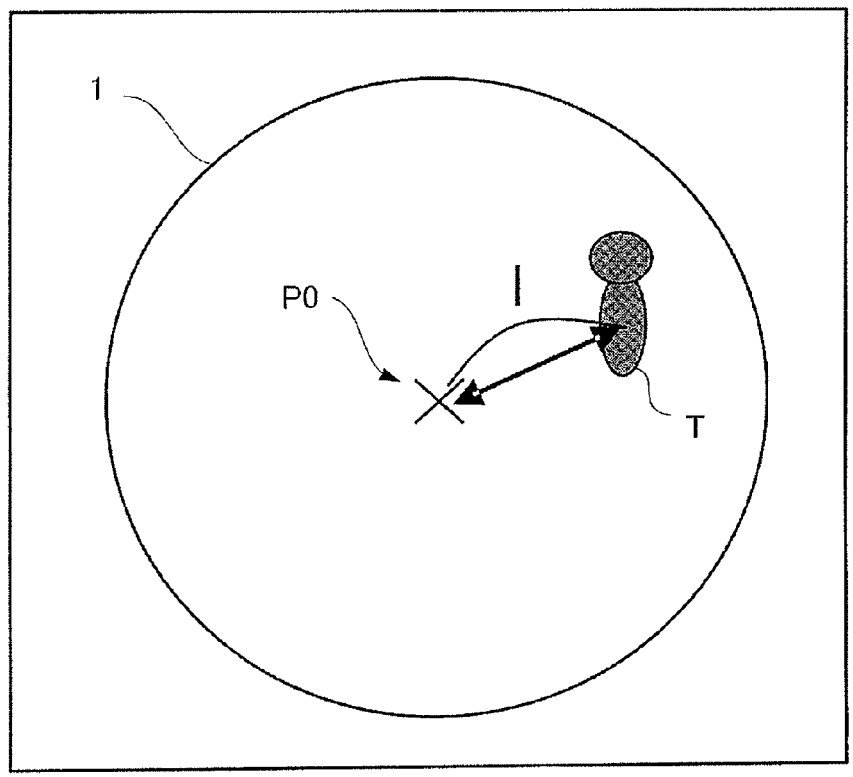
FIG. 3B shows a captured image.

In this way, the relationship between angle θ and distance 1 is uniquely established using focal length f and coefficients $\kappa_1$, $\kappa_2$, and so forth. Thus, if a compression rate is set according to angle θ, a compression rate corresponding to distance 1 can easily be found from that compression rate. That is to say, as shown in FIG. 3B, on omnidirectional image 1, a compression rate of object T at distance 1 from point P0 corresponding to optical axis C0 can be set according to the value of distance 1. Since finding distance 1 from the camera to each of targets T1 through T6 in real space from omnidirectional image 1 is difficult, a distance measurement section is used. The method of finding distance 1 will be described later herein.

Figure 4:
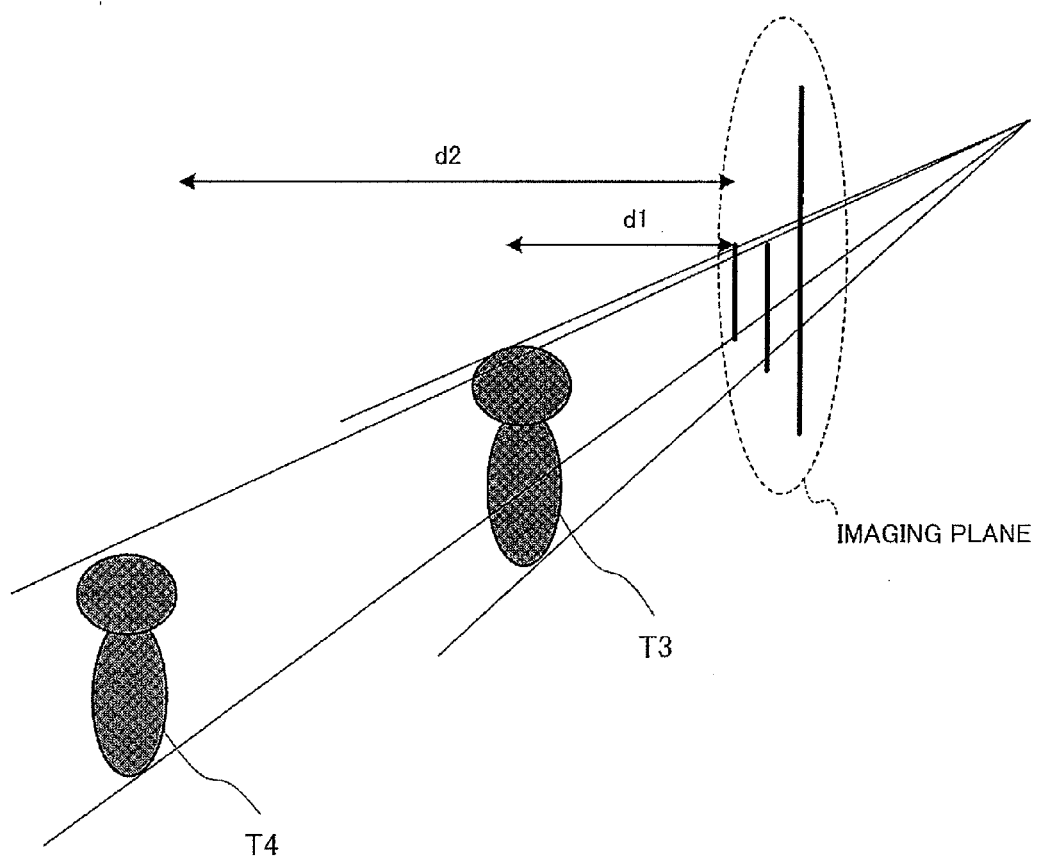
FIG. 4 shows that the size of a captured image differs according to the distance to a target.

FIG. 4 shows that the size (the term "resolution" may also be used) of a captured image when the same object is imaged differs according to distance d to a target. The greater distance d from the imaging plane of the camera to a target, the smaller is the captured image size. For example, when distance d1 to target T3 is 5 [m] and distance d2 to target T4 is 10 [m], target T3 becomes a 10-pixel image and target T4 becomes a 5-pixel image, and therefore the resolution of target T3 is twice the resolution of target T4.

[1-4-1] Processed images when using first compression method ("greatly reducing the data amount of a low-quality region, and maintaining the quality of a high-quality region")

In FIG. 2, division regions A1 and A2 that include targets T1 and T2 are compressed using a large compression rate since angle θ1 from optical axis C0 is large and distortion is great. Division regions A3 and A4 that include targets T3 and T4 are compressed using a lower compression rate than for targets T1 and T2 since angle θ2 from optical axis C0 is smaller than angle θ1 and distortion is less. Targets T5 and T6 are compressed using a high compression rate since they are in the vicinity of optical axis C0 and only their heads are shown.

Also, distance d1 of T1, T3, and T5 from omnidirectional camera 10 is smaller than distance d2 of T2, T4, and T6 from omnidirectional camera 10 (d1<d2), and therefore T1, T3, and T5 are compressed using a lower compression rate than T2, T4, and T6.

Here, in order to simplify the explanation, a case has been described in which omnidirectional image 1 is divided into division regions A1 through A6 that include targets T1 through T6, as shown in FIG. 2, and the compression rates of these division regions A1 through A6 are changed according to angle θ (length 1 from point P0 to division regions A1 through A6 in a captured image) and distance d, but the present invention is not limited to a case in which targets are considered when dividing an image. That is to say, provision may also be made for omnidirectional image 1 to be divided into a plurality of regions according to angle θ (the length from point P1 to division regions A1 through A6 in a captured image), and for each of the divided region images to be compressed while changing the compression rate according to angle θ (the length from point P1 to division regions A1 through A6 in a captured image).

Figure 5:
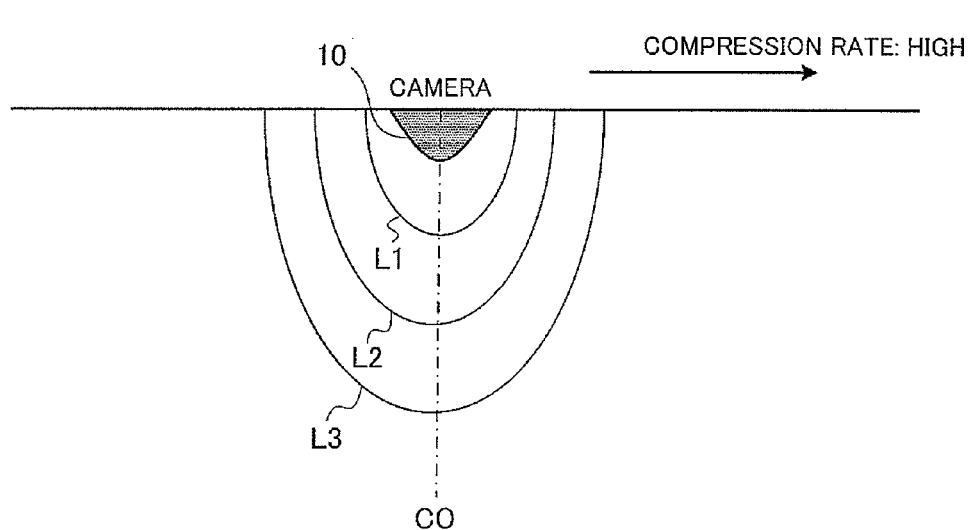
FIG. 5 shows compression rate contour lines in three-dimensional space.

FIG. 5 shows compression rate contour lines in three-dimensional space when, of the first compression method, above rule (i) "the larger the angle from the optical axis of an obtained region image, the larger is the compression rate used for compression" and above rule (ii) "the greater the distance of an object image from the camera, the larger is the compression rate used for compression" are used in combination. In FIG. 5, the following relationship applies to contour lines L1 through L3: compression rate indicated by contour line L1<compression rate indicated by contour line L2<compression rate indicated by contour line L3.

Figure 6:
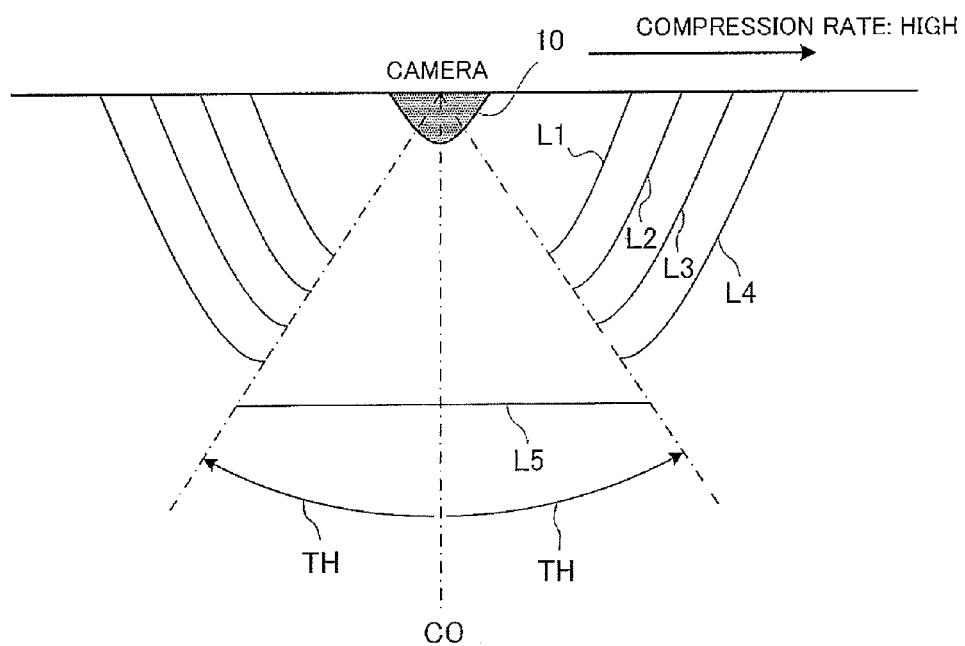
FIG. 6 shows compression rate contour lines in three-dimensional space.
Figure 7:
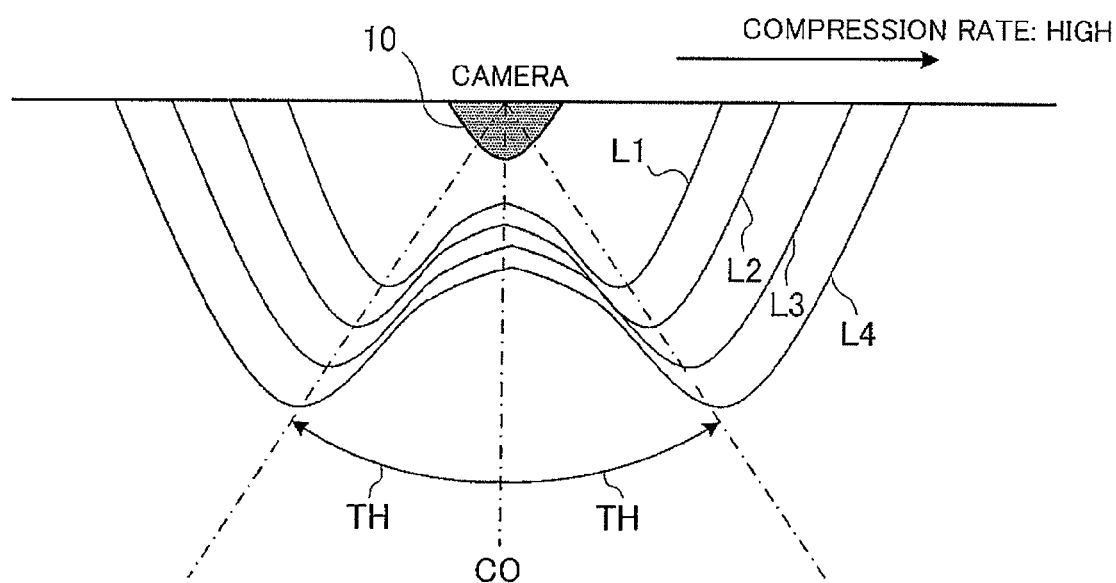
FIG. 7 shows compression rate contour lines in three-dimensional space.

FIG. 6 shows compression rate contour lines in three-dimensional space when, of the first compression method, above rule (i) "the larger the angle from the optical axis of an obtained region image, the larger is the compression rate used for compression," above rule (ii) "the greater the distance of an object image from the camera, the larger is the compression rate used for compression," and above rule (iii) "an image in the vicinity of the optical axis (0≤θ<TH, where TH is a predetermined threshold value) is compressed using a large compression rate," are used in combination. In FIG. 6, the following relationship applies to contour lines L1 through L5: compression rate indicated by contour line L1<compression rate indicated by contour line L2<compression rate indicated by contour line L3<compression rate indicated by contour line L4<compression rate indicated by contour line L5. In FIG. 6, a case is shown in which an image in the vicinity of the optical axis (0≤θ<TH) is compressed using fixed compression rate L5, but, as shown in FIG. 7, the compression rate of an image in the vicinity of the optical axis (0≤θ<TH) may also be changed according to angle θ (the length from point P1 in a captured image) while making the compression rate relatively larger than for images of other regions.

[1-4-2] Processed images when using second compression method ("obtaining an image of average resolution in all regions")

In FIG. 2, division regions A1 and A2 that include targets T1 and T2 are compressed using a low compression rate since angle θ1 from optical axis C0 is large and distortion is great. Division regions A3 and A4 that include targets T3 and T4 are compressed using a higher compression rate than for targets T1 and T2 since angle θ2 from optical axis C0 is smaller than angle θ1 and distortion is less.

Also, distance d1 of T1, T3, and T5 from omnidirectional camera 10 is smaller than distance d2 of T2, T4, and T6 from omnidirectional camera 10 (d1<d2), and therefore T1, T3, and T5 are compressed using a higher compression rate than T2, T4, and T6.

Figure 8:
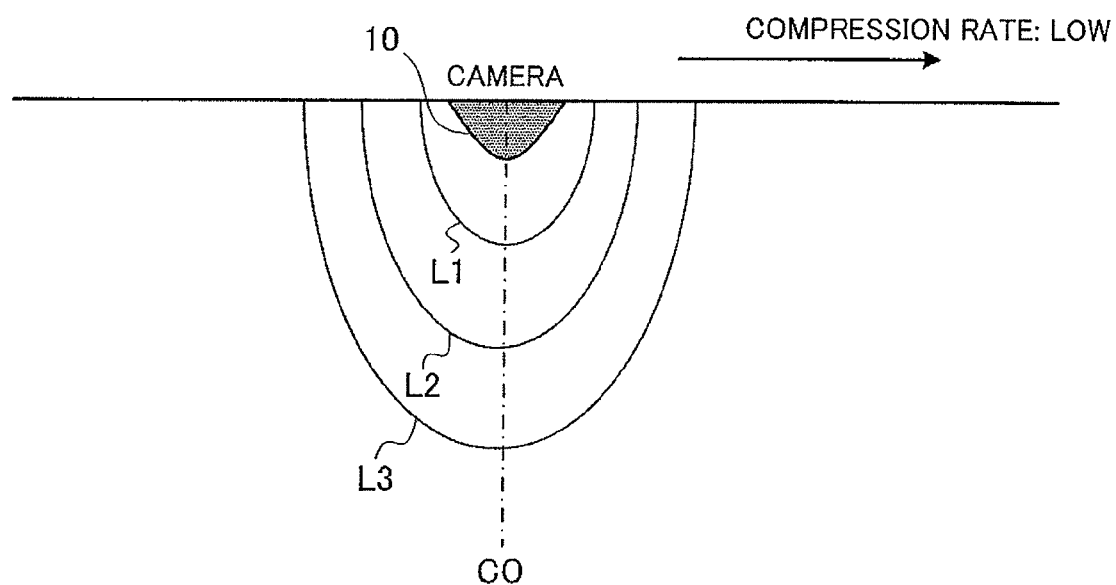
FIG. 8 shows compression rate contour lines in three-dimensional space.

FIG. 8 shows compression rate contour lines in three-dimensional space when, of the second compression method, above rule (iv) "the larger the angle from the optical axis of an obtained region image, the smaller is the compression rate used for compression" and above rule (v) "the greater the distance of an object image from the camera, the smaller is the compression rate used for compression" are used in combination. In FIG. 8, the following relationship applies to contour lines L1 through L3: compression rate indicated by contour line L1>compression rate indicated by contour line L2>compression rate indicated by contour line L3.

[1-5] Compression Rate Setting

Actual compression rate setting will now be described.

When the above first compression method is used, a compression rate can be found by means of following equation 2 or equation 3.

$$\text{Compression rate} = (\theta \times \alpha) \times (d \times \beta) \quad \text{(Equation 2)}$$

$$\text{Compression rate} = (\theta \times \alpha) + (d \times \beta) \quad \text{(Equation 3)}$$

However, for a 0≤θ<TH region, the compression rate is set to a fixed value relatively larger than for other regions.

Coefficient α by which angle θ is multiplied can be set, for example, according to a lens characteristic dependent distortion coefficient, aberration, resolution, or the like, included in camera parameters. Also, coefficient β by distance d is multiplied can be set, for example, according to a focal length or the like included in camera parameters.

When the above second compression method is used, a compression rate can be found by means of following equation 4 or equation 5.

$$\text{Compression rate} = (1/\theta \times \alpha) \times (1/d \times \beta) \quad \text{(Equation 4)}$$

$$\text{Compression rate} = (1/\theta \times \alpha) + (1/d \times \beta) \quad \text{(Equation 5)}$$

FIG. 9 shows examples of α values. FIG. 9 shows examples of α value settings when using the above-described second compression method with a camera having a central resolution (that is, θ=0 resolution) of 190 [LP/mm] and a lens edge resolution (that is, θ=90° resolution) of 100 [LP/mm].

FIG. 10 shows actual examples of compression rates.

[2] Embodiment 1

Figure 11:
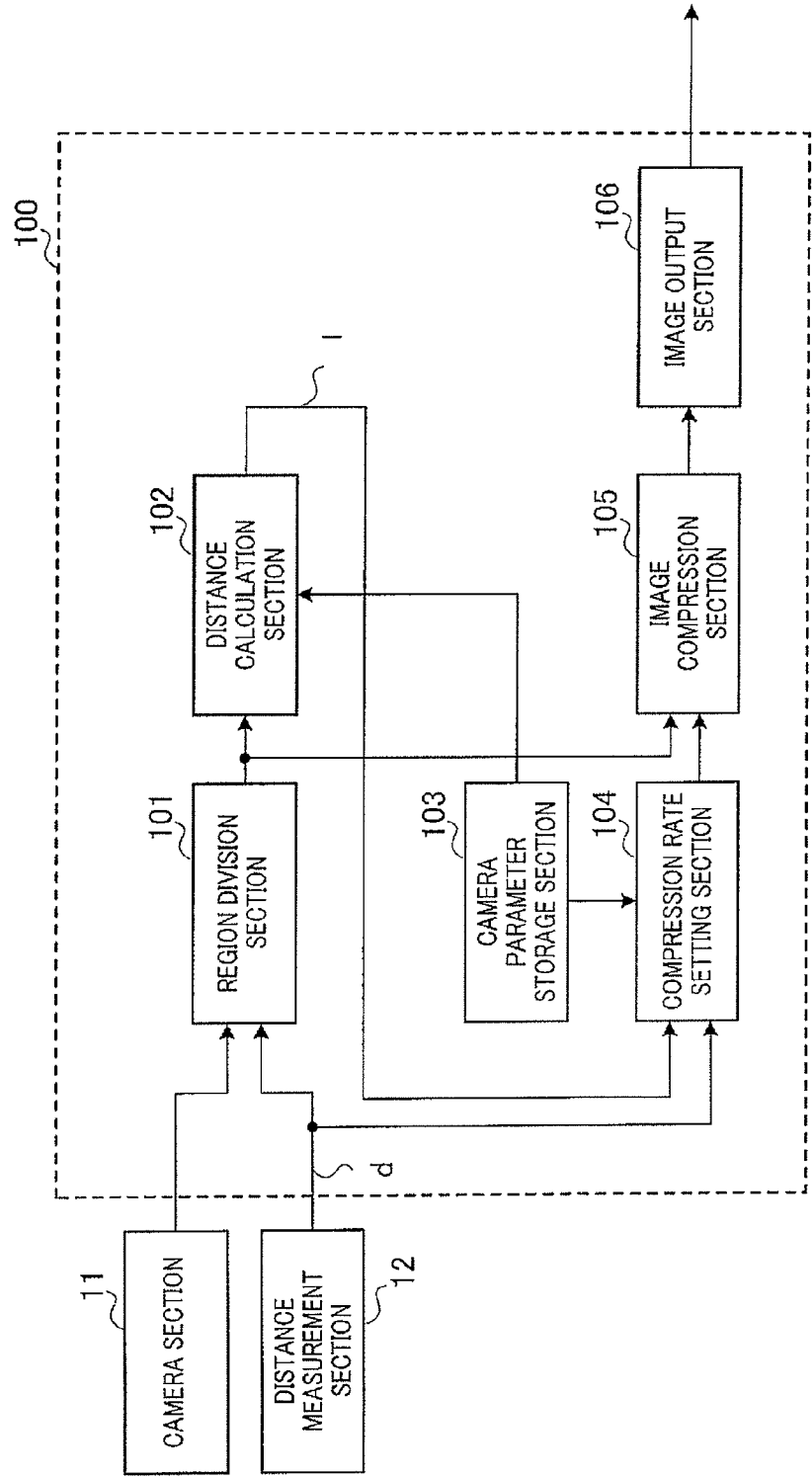
FIG. 11 is a block diagram showing a configuration of Embodiment 1.

FIG. 11 shows a configuration according to Embodiment 1 of the present invention. Wide-angle camera apparatus 110 in FIG. 11 has camera section 11, distance measurement section 12, and image processing apparatus 100.

Camera section 11 is an omnidirectional camera, for example. Camera section 11 need not necessarily be an omnidirectional camera, but should be a camera whose imaging quality degrades due to distortion or the like as angle θ from the optical axis increases. If camera section 11 is an omnidirectional camera, the effects of the present invention are pronounced, and therefore a case in which camera section 11 is an omnidirectional camera is described below. An omnidirectional image obtained by means of camera section 11 is output to region division section 101 of image processing apparatus 100.

Distance measurement section 12 is positioned accompanying camera section 11, or is incorporated in camera section 11. Distance measurement section 12 measures distance d between a target present within an imaging region and camera section 11. An ultrasonic sensor, infrared sensor, or suchlike ranging sensor can be used as distance measurement section 12. Also, distance measurement section 12 may have a configuration whereby a signal from a wireless tag attached to a target is received, wireless tag position coordinates are found based on the received radio signal, and distance d is found from these position coordinates and the position coordinates of camera section 11. Furthermore, if camera section 11 has a configuration capable of acquiring a stereo image, distance measurement section 12 may found the distance to a target using a stereo image. Distance measurement section 12 may be of any configuration that enables a target to be ranged within an imaging space. Distance d information obtained by means of distance measurement section 12 is output to region division section 101 and compression rate setting section 104.

Region division section 101 divides an omnidirectional image into a plurality of regions. At this time, region division section 101 may perform division into division regions A1 through A6 that include targets T1 through T6 based on targets T1 through T6 in omnidirectional image 1 as shown in FIG. 2, or may simply perform division into a plurality of regions without regard to targets T1 through T6. Images for which distance d differs are divided into different regions.

Figure 12:
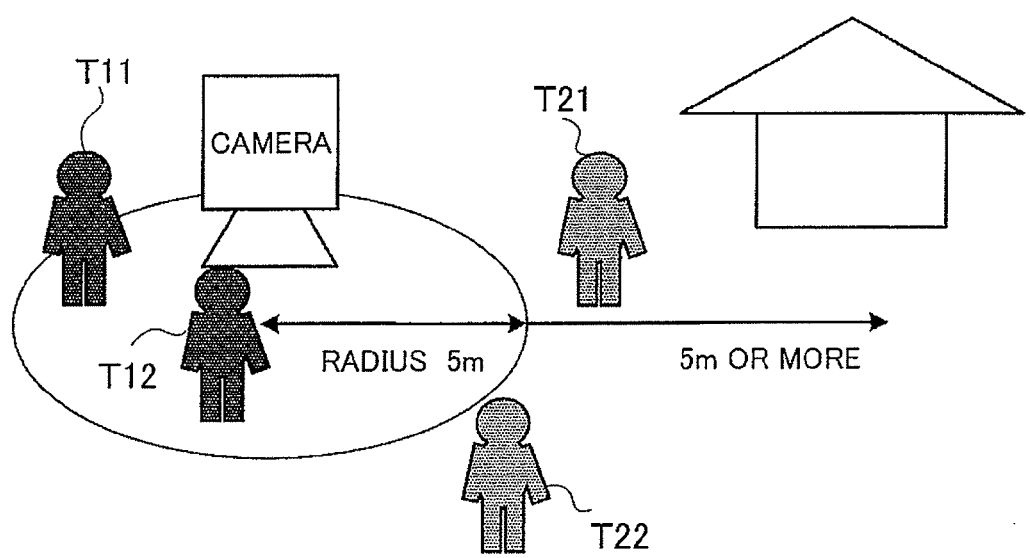
FIG. 12 shows an example of region division according to distance d.

FIG. 12 shows an example of region division according to distance d. FIG. 12 shows an example of region division into a region for which the distance from the camera is less than 5 [m], and a region for which this distance is 5 [m] or more. That is to say, if angle θ is ignored, an image that includes targets T11 and T12 is divided into an image of a region different from an image that includes targets T21 and T22. If distance is measured using a stereo image, distance can be measured for each pixel, enabling region division to be performed by collecting together adjacent pixels at virtually the same distance based on per-pixel distance information. An omnidirectional image divided into a plurality of regions is output to distance calculation section 102.

Distance calculation section 102 calculates distance 1 from point P0 corresponding to optical axis C0 to each division region in a captured image.

Compression rate setting section 104 sets the compression rate of each region image from above distance 1 in a captured image and distance d from camera section 11 to a target. In actuality, compression rate setting section 104 has a table in which compression rates corresponding to distance 1 and distance d are stored, and outputs a compression rate corresponding to distance 1 and distance d using distance 1 and distance d as a read address. As stated above, a compression rate corresponding to angle θ can be found using any of equations 2 through 5. Also, since the relationship between angle θ and distance 1 is decided uniquely by equation 1, a compression rate corresponding to distance 1 can be found from a compression rate corresponding to angle θ. A table in compression rate setting section 104 stores these compression rates corresponding to distance 1. As stated above, coefficients α and β in equations 2 through 5 can be set according to a distortion coefficient, aberration, resolution, focal length, or the like, stored in camera parameter storage section 103. Also, as stated above, when the first compression method is used, the compression rate for a 0≤θ<TH region can be set to a value relatively larger than for other regions.

Image compression section 105 obtains compression-encoded data by performing compression encoding of each region image divided by region division section 101 using a compression rate set by compression rate setting section 104.

Image output section 106 outputs compression-encoded data to a channel, recording medium, or the like. Compression-encoded data transmitted to a counterpart apparatus via a channel is decoded and displayed by the counterpart apparatus. Compression-encoded data recorded on a recording medium is playback-decoded and displayed by a playback apparatus.

According to the above configuration, high-image-quality, high-efficiency image compression that takes the camera characteristics of a wide-angle camera into consideration can be implemented by providing region division section 101 that divides a captured image obtained by means of camera section 11 into a plurality of regions, and image compression section 105 that compresses each region image divided by region division section 101 while changing the compression rate according to distance 1 from a predetermined point in the captured image (a point corresponding to optical axis C0, the center point of the captured image in omnidirectional image 1) to each region image and distance d from camera section 11 to targets T1 through T4 included in each region.

[3] Embodiment 2

Figure 13:
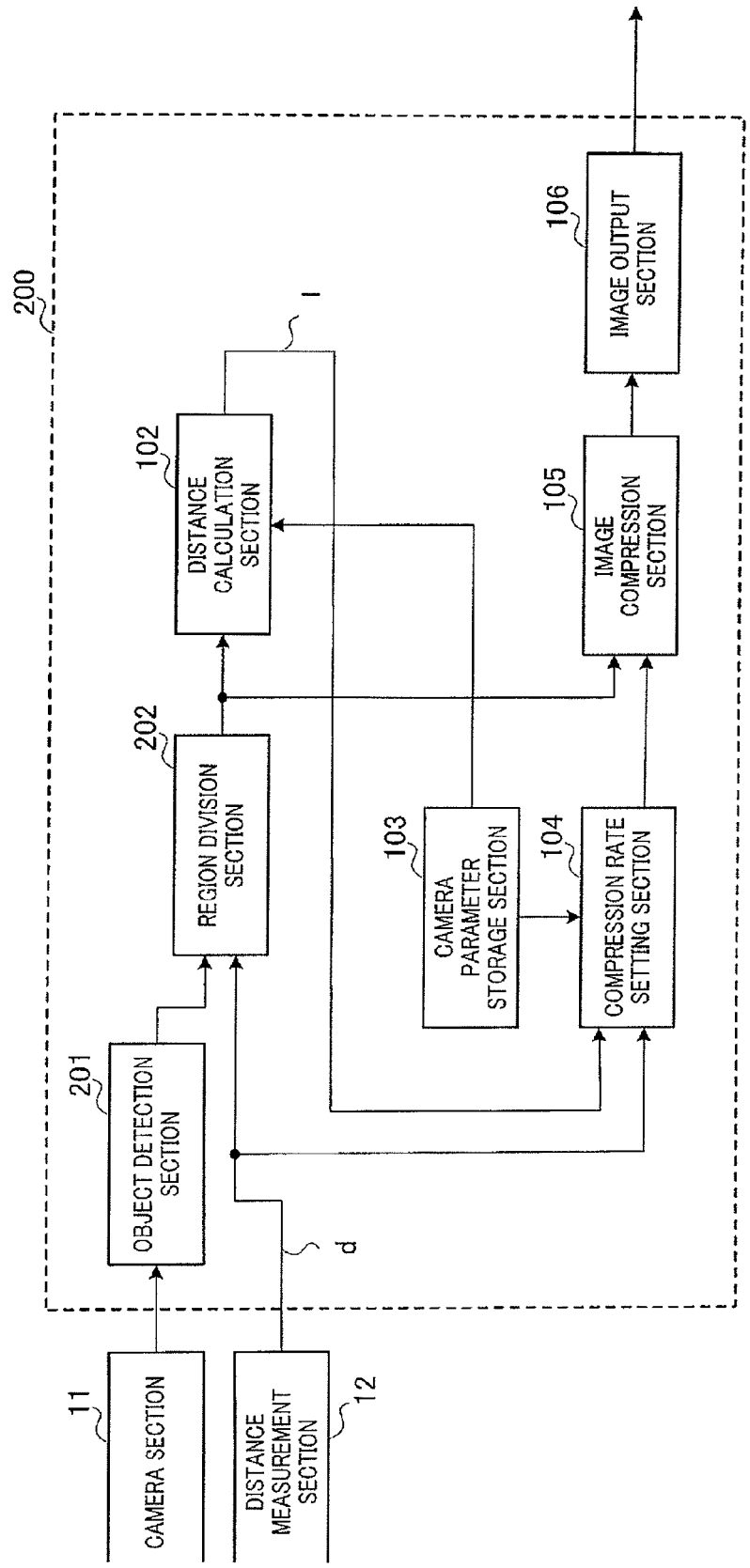
FIG. 13 is a block diagram showing a configuration of Embodiment 2.

FIG. 13, in which parts corresponding to those in FIG. 11 are assigned the same reference codes as in FIG. 11, shows the configuration of a wide-angle camera apparatus of Embodiment 2. Image processing apparatus 200 of wide-angle camera apparatus 210 has object detection section 201.

Object detection section 201 detects an object of interest (that is, a target) from an omnidirectional image. Object detection section 201 detects a moving object, for example, as a target. Object detection section 201 may also detect a specific object classified according to type. Processing for detecting and classifying an object included in an image can easily be implemented by means of known technology. A brief description of such processing is given below.

Figure 14:
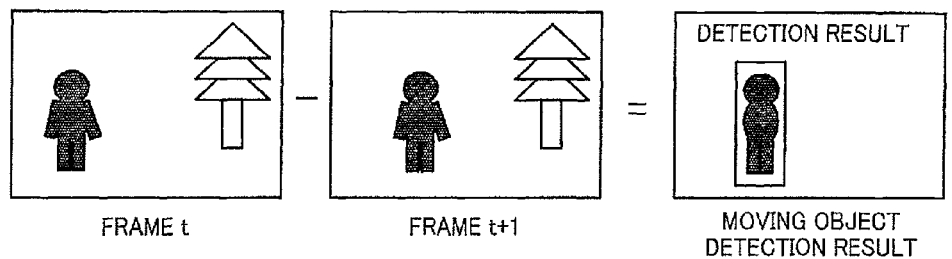
FIG. 14 shows how a moving object is detected by means of frame differencing processing.

FIG. 14 shows how a moving object is detected by means of frame differencing processing. This figure shows how an object that is a moving object is detected by finding the difference between frame t and frame t+1.

Figure 15:
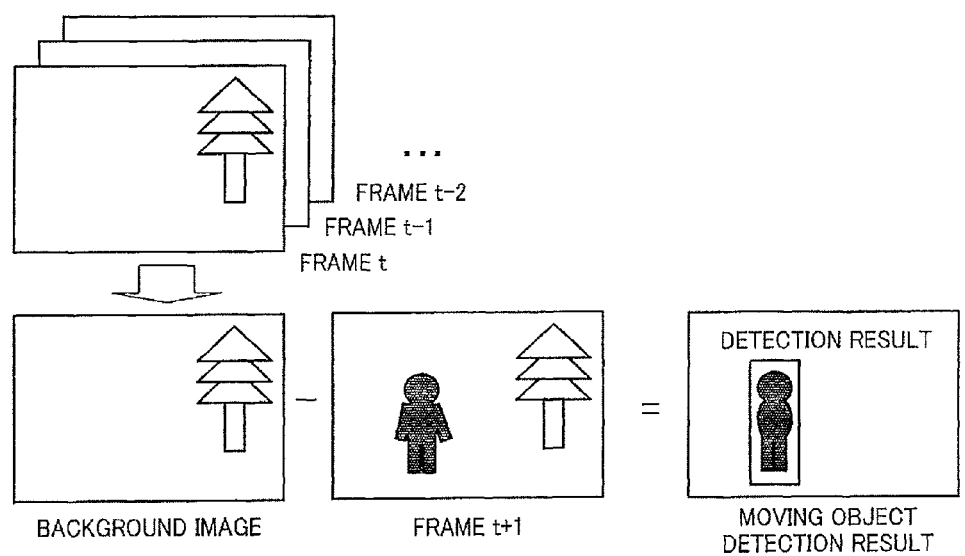
FIG. 15 shows how a moving object is detected by means of background differencing processing.

FIG. 15 shows how a moving object is detected by means of background differencing processing. This figure shows how an object that is a moving object is detected by obtaining a background image from images of a plurality of frames (frame t−2, frame t−1, and frame t), and finding the difference between this background image and a frame t+1 image.

Figure 16:
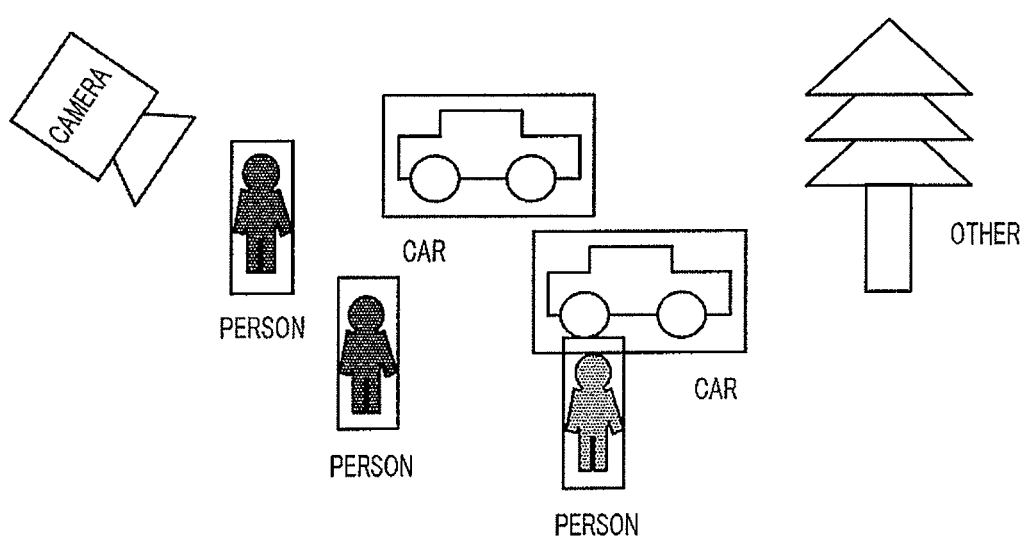
FIG. 16 shows how persons and vehicles are detected by classification from a captured image.

FIG. 16 shows how persons and vehicles are detected by classification from a captured image.

Figure 17A:
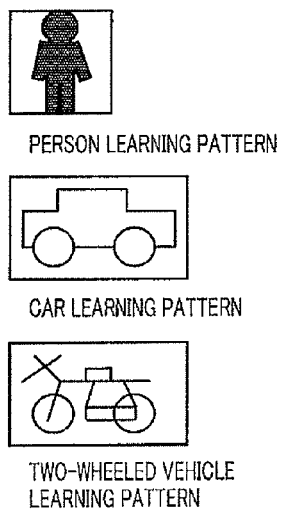
FIG. 17 shows an example of processing for detecting a specific object by classification according to type.
Figure 17B:
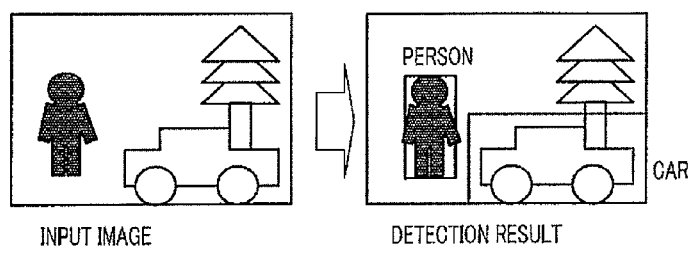

FIG. 17 shows an example of processing for detecting a specific object by classification according to type. Object detection section 201 holds the shapes of a person, a car, a two-wheeled vehicle, and so forth, as a result of learning, as shown in FIG. 17A. Then object detection section 201 detects a specific object included in an input image by performing pattern matching processing on the input image and learning patterns.

Object detection section 201 outputs a moving object or suchlike specific object detection result to region division section 202. As shown in FIG. 2, for example, region division section 202 divides an omnidirectional image into regions that include a specific object (in the case of FIG. 2, a person).

Later-stage distance calculation section 102, compression rate setting section 104, and image compression section 105 perform the same kind of processing as in Embodiment 1 on only a predetermined image region that includes a specific object, rather than on the entire image. By this means, only an important region that includes a specific object is compressed using a compression rate that takes the camera characteristics of a wide-angle camera into consideration as shown in Embodiment 1. A region other than an important region that includes a specific object is compressed using a larger compression rate than that for an important region.

By this means, in addition to achieving the effects of Embodiment 1, the data amount of compression-encoded data is significantly reduced by increasing the compression rate of a region other than an important region.

[4] Other Embodiments

In addition to the processing of the above-described embodiments, compression processing may be performed that takes account of the performance of super-resolution processing on the decoding side. Here, an aliasing distortion component of a captured image is necessary in order to perform super-resolution processing. If compression whereby a high-frequency component of an image is eliminated is performed, an aliasing distortion component is also lost, making super-resolution processing difficult. In view of this, it is desirable to prevent the loss of a high-frequency component due to compression as far as possible by performing compression encoding of a high-frequency component using a compression rate that is, for example, 10% smaller than that for other components.

Image processing apparatuses 100 and 200 of the above embodiments can be configured by means of a computer such as a personal computer that includes memory and a CPU. The functions of the configuration elements composing image processing apparatuses 100 and 200 can then be implemented by having the CPU read and execute a computer program stored in the memory.

The disclosure of Japanese Patent Application No. 2009-204038, filed on Sep. 3, 2009, including the specification, drawings and abstract, is incorporated herein by reference in its entirety.

INDUSTRIAL APPLICABILITY

The present invention is suitable for use in compressing an image captured by an omnidirectional camera or suchlike wide-angle camera, for example.

REFERENCE SIGNS LIST

1 Omnidirectional image
10 Omnidirectional camera
11 Camera section
12 Distance measurement section
100 Image processing apparatus
101, 202 Region division section
102 Distance calculation section
103 Camera parameter storage section
104 Compression rate setting section
105 Image compression section
106 Image output section
110, 210 Wide-angle camera apparatus
201 Object detection section
T1-T6 Target
θ1-θ3 Angle
d1, d2 Distance
C0 Optical axis
A1-A6 Division region

The invention claimed is:

1. An image processing apparatus, comprising:
a region division section that divides a captured image obtained by an imaging section positioned directed toward the ground into a plurality of regions; and
an image compression section that, of each region image resulting from division by the region division section, performs compression for a region image captured at an angle greater than or equal to a threshold value from an optical axis of the imaging section, using a smaller compression rate the smaller an angle from the optical axis at which a region image is captured, and performs compression for a region image, captured at an angle less than a threshold value from the optical axis, using a compression rate larger than a compression rate of a region image captured at an angle from the optical axis, that is an angle of the threshold value, the smaller an angle from the optical axis at which a region image is captured.

2. The image processing apparatus according to claim 1, wherein the image compression section further changes the compression rate according to a distance from the imaging section to a target included in the each region image.

3. The image processing apparatus according to claim 2, wherein the image compression section performs compression using a larger compression rate the greater a distance of a region image that includes a target from the imaging section.

4. The image processing apparatus according to claim 3, wherein:
the captured image is an omnidirectional image; and
the predetermined point is an approximately center point of a captured image.

5. The image processing apparatus according to claim 2, wherein:
the captured image is an omnidirectional image; and
the predetermined point is an approximately center point of a captured image.

6. The image processing apparatus according to claim 1, wherein:
the captured image is an omnidirectional image; and
the predetermined point is an approximately center point of a captured image.

7. An image processing method comprising:
dividing a captured image obtained by an imaging section positioned directed toward the ground into a plurality of regions; and
performing, of each region image resulting from division by the region division section, compression for a region image captured at an angle greater than or equal to a threshold value from an optical axis of the imaging section using a smaller compression rate the smaller an angle from the optical axis at which a region image is captured, and performing compression for a region image captured at an angle less than a threshold value from the optical axis using a compression rate larger than a compression rate of a region image captured at an angle from the optical axis that is an angle of the threshold value the smaller an angle from the optical axis at which a region image is captured.

8. A program stored in a non transitory computer readable memory that causes a computer to execute:
dividing a captured image obtained by an imaging section positioned directed toward the ground into a plurality of regions; and
performing, of each region image resulting from division by the region division section, compression for a region image captured at an angle greater than or equal to a threshold value from an optical axis of the imaging section using a smaller compression rate the smaller an angle from the optical axis at which a region image is captured, and compression for a region image captured at an angle less than a threshold value from the optical axis using a compression rate larger than a compression rate of a region image captured at an angle from the optical axis that is an angle of the threshold value the smaller an angle from the optical axis at which a region image is captured.

* * * * *